(12) United States Patent
Healy et al.

(10) Patent No.: US 8,152,915 B2
(45) Date of Patent: Apr. 10, 2012

(54) PROCESS FOR PREPARATION OF A NOVEL PIGMENTED COMPOSITION FOR USE IN GRAVURE INKS

(75) Inventors: Thomas Healy, Renfrewshire (GB); Ian Andrew Lambie, Renfrewshire (GB)

(73) Assignee: BASF SE, Ludwigshafen (DE)

( * ) Notice: Subject to any disclaimer, the term of this patent is extended or adjusted under 35 U.S.C. 154(b) by 323 days.

(21) Appl. No.: 11/991,112

(22) PCT Filed: Aug. 25, 2006

(86) PCT No.: PCT/EP2006/065668
§ 371 (c)(1),
(2), (4) Date: Feb. 27, 2008

(87) PCT Pub. No.: WO2007/025932
PCT Pub. Date: Mar. 8, 2007

(65) Prior Publication Data
US 2009/0137706 A1 May 28, 2009

(30) Foreign Application Priority Data

Sep. 2, 2005 (EP) .................................. 05108064

(51) Int. Cl.
*C09B 67/04* (2006.01)
*C09B 67/20* (2006.01)
*C09B 67/22* (2006.01)
*C09B 67/48* (2006.01)
*C09B 67/50* (2006.01)

(52) U.S. Cl. .................... 106/412; 106/411; 106/413

(58) Field of Classification Search .................. 523/160, 523/161; 106/411, 412, 413
See application file for complete search history.

(56) References Cited

U.S. PATENT DOCUMENTS

| | | | |
|---|---|---|---|
| 5,427,616 A | 6/1995 | Tsuji et al. | 106/412 |
| 5,919,299 A | 7/1999 | Kilmurray et al. | 106/497 |
| 5,942,028 A | 8/1999 | Tomiya et al. | 106/31.78 |
| 6,241,814 B1 | 6/2001 | Urban et al. | 106/497 |
| 6,379,450 B1 | 4/2002 | Willis et al. | 106/412 |
| 2004/0260083 A1 | 12/2004 | Shiromaru et al. | 540/130 |
| 2006/0112852 A1 | 6/2006 | Klopp et al. | 106/31.78 |
| 2006/0112856 A1 | 6/2006 | Brychcy et al. | 106/412 |

FOREIGN PATENT DOCUMENTS

| | | | |
|---|---|---|---|
| EP | 0 392 334 | | 10/1990 |
| EP | 422907 A | * | 4/1991 |
| EP | 0 629 668 | | 12/1994 |
| EP | 0 819 740 | | 1/1998 |
| EP | 0 971 001 | | 1/2000 |
| EP | 1 489 143 | | 12/2004 |
| JP | 2003-335997 | | 11/2003 |
| WO | 01/66650 | | 9/2001 |
| WO | 2004/050770 | | 6/2004 |
| WO | 2004/052996 | | 6/2004 |

OTHER PUBLICATIONS

Machine Translation of JP 2003-231829 A.*
Patent Abstracts of Japan Pub. No. 2003-335997.
English Language abstract of EP 0 392 334 from the esp@cenet web site printed on May 7, 2008.

* cited by examiner

*Primary Examiner* — James J Seidleck
*Assistant Examiner* — Vu A Nguyen
(74) *Attorney, Agent, or Firm* — Qi Zhuo

(57) ABSTRACT

The invention pertains to a novel, simpler dry-milling method for comminuting crude pigments (especially crude phthalocyanines) for use in publication gravure and packaging inks, wherein the crude pigment is dry-milled at relatively low temperature in combination with a resin and a pigment derivative, preferably further together with an extender and optionally an antioxidant. The invention also pertains to the thus obtained, new compositions, which are extraordinarily easily dispersible in aromatic solvents, and their use for the preparation of publication gravure or packaging inks or ink concentrates. Pigment dispersions obtained from the preferred compositions are also claimed.

3 Claims, No Drawings

PROCESS FOR PREPARATION OF A NOVEL PIGMENTED COMPOSITION FOR USE IN GRAVURE INKS

The invention pertains to a novel, simpler dry-milling method for comminuting crude pigments (especially crude phthalocyanines) for use in publication gravure and packaging inks, wherein the crude pigment is dry-milled at relatively low temperature in combination with a resin and a pigment derivative, preferably further together with an extender and optionally an antioxidant. The invention also pertains to the thus obtained, new compositions, which are extraordinarily easily dispersible in aromatic solvents, and their use for the preparation of publication gravure or packaging inks or ink concentrates. Pigment dispersions obtained from the preferred compositions are also claimed.

Phthalocyanines are a typical example of crude pigments which are not useful as such for pigmentary purposes. The coarse crystals of crude phthalocyanines must be acid-pasted or ground to smaller size, a process of greater importance than the synthesis and first described in 1936. High color strength and good dispersive properties can be obtained when water-soluble salts such as sodium chloride or anhydrous sodium sulfate are used as grinding agents, either in dry form or with a small amount of solvents such as alcohols. Washing out the salts with water gives a color-intensive pigment. This simple procedure has often been modified, for example by addition of surfactants, dispersants or resins. Crude phthalocyanines can also be ground in the dry state without grinding aids but often with a surfactant. However, this milled product exhibits satisfactory pigment properties only after further treatment in water immiscible organic solvents (see Ullmann's Encyclopedia of Industrial Chemistry [2002], chapter about Phthalocyanines, §4.4.2.).

KR 6370 B discloses kneading crude phthalocyanine with salt and polyols in the presence of phthalocyanine derivatives. JP H04/320 458 A contends that energy savings are possible in this typical process by first dry-milling the crude phthalocyanine with the phthalocyanine derivatives and then only kneading with salt and an organic liquid such as polyethylene glycol.

EP 0 819 740 B2 (WO 97/28 224 A1) discloses dry-milling crude copper phthalocyanine with from 20 to 80% of resin and dry-milling the mixture while heating to a temperature of from 80 to 170° C., preferably from 115 to 170° C. No pigment derivative is added. The mill-base is then heated in an aliphatic solvent until the aspect ratio is below 2 and most a form is converted to β. Dispersion, however, requires further grinding in a three roll mill. The quality of the final offset ink is purportedly equal to that of inks obtained from conventional salt-kneaded pigments. Closely similar is JP H11/035 841 A, which performs the dry-milling process in two steps.

JP2003/041 173 A discloses a process for producing printing ink wherein crude phthalocyanine is dry-milled at 80 to 150° C. with an extender such as calcium carbonate, a resin is then added, and the resulting mixture is dry-milled again or mixed vigorously for a short period of time to avoid degradation. An ink is obtained after heating to 80 to 170° C. in an aliphatic solvent, two passes on the three roll mill and dilution. Dispersants such as conventional pigment derivatives may be added.

JP 2003/231 829 A discloses a process for producing printing ink wherein crude phthalocyanine is first surface treated with a rosin in a solvent, leading to a pre-pigment which is dried then dry-milled, generally with an extender and further resin. An ink concentrate is obtained after heating for two hours to 110-120° C., followed by two passes on the three roll mill, then dilution to an ink with a saturated hydrocarbon solvent. No pigment derivative is used; on the contrary, it is preferable to use copper phthalocyanine having a purity of ≥97%.

JP 2003/335 997 A proposes to dry-mill crude copper phthalocyanine with from 10 to 20% of resins having a softening temperature of 165° C. or more, preferably modified rosins lacking metal cations. In analogy with EP 0 392 334 B2, a higher amount of resin is disclosed to be undesirable. The final ink is made by heating the millbase to 120° C. in a varnish based on an almost aromatic-free solvent, then processing in the three roll mill. From 0.1 to 20 parts of copper phthalocyanine derivatives per 100 parts of crude phthalocyanine are disclosed, but no extenders.

However, none of these prior art processes is entirely satisfactory. The kneading method is slow, requires expensive machinery and high amounts of water-soluble salts and solvents must be disposed of. Environmental, safety and health concerns arise when compositions comprising solvents are heated to higher temperatures in an open equipment. Prolonged dispersion on a three roll or bead mill requires a rigorous quality control, because the pigment particles are ground again.

Thus, there is a strong demand for pigments which show top performance in printing inks without requiring special efforts from the ink makers, who prefer to concentrate their efforts on developing better ink compositions while starting from already finished, easily dispersible pigments from pigment manufacturers.

Hence, the invention's goal was to simplify the whole process manufacture of gravure inks while improving their properties. Surprisingly, this could be achieved by providing a novel type of pigment preparation, which can be dispersed simply by stirring in non-polar inks based on aromatic hydrocarbon solvents, optionally further comprising low molecular weight alcohols, ethers, esters, ketones or mixtures thereof. Much better results are obtained, than could be expected from the prior art.

Surprisingly, it has now been found that a significant progress is obtained by dry-milling crude pigments in the presence of certain amounts of resin and pigment derivatives, preferably in the further presence of an extender and optionally an antioxidant, while avoiding overheating. The resulting pigment composition is extraordinarily well dispersible in aromatic and other solvents and varnishes comprising such solvents. Thus, it is not necessary to use high energy equipment such as kneaders or bead mills, though this is of course feasible if desired. In addition, the colour strength is improved. The ink's drying and hardening properties are satisfactory notwithstanding the instant amount of antioxidant.

Hence, the invention pertains to a process for producing a pigment composition, comprising the step of milling together a composition comprising
(a) a crude pigment;
(b) from 8 to 15% by weight, preferably from 10 to 12% by weight, based on the amount of crude pigment (a), of a chromophore substituted by sulfo; $SO_3R_1$; alkali, earth alkali or $N^+R_1R_2R_3R_4$ sulfonato; $SO_2NR_1R_2$; $CH_2NR_1R_2$, phthalimidomethyl, N-pyrazolylmethyl or N-saccharinyl-methyl, wherein $R_1$, $R_2$, $R_3$ and $R_4$ are independently from each other hydrogen or $C_1$-$C_{24}$alkyl, $C_3$-$C_{24}$cycloalkyl, $C_2$-$C_{24}$alkenyl, $C_7$-$C_{24}$aralkyl or $C_6$-$C_{24}$aryl each unsubstituted or substituted by hydroxy and/or halogen, whereby alkyl may be uninterrupted or optionally interrupted from one to ten times by O, $N(C_1$-$C_8$alkyl) or NH, and phthalimido is unsubstituted or substituted by halogen or nitro;

(c) from 20 to 55% by weight, preferably from 25% to 50% by weight, based on the amount of crude pigment (a), of a resin;

(d) preferably from 2 to 18% by weight, more preferably from 5 to 18% by weight, most preferred from 10 to 18% by weight, based on the total weight of (a) and (b), of an extender; and (e) optionally further components, comprising preferably from 1 to 10% by weight, based on the amount of crude pigment (a), of an antioxidant, wherein the composition remains pulverulent or granular during milling.

The chromophore of (b) is suitably a pigment chromophore. Components (a) and (b) preferably pertain to the same pigment chromophore class. With particular preference, the chromophore part of (b) is identical with (a)—that is, (b) is a derivative of (a), wherein (a) is substituted by sulfo; $SO_3R_1$; alkali, earth alkali or $N^+R_1R_2R_3R_4$ sulfonato; $SO_2NR_1R_2$; $CH_2NR_1R_2$, phthalimidomethyl, N-pyrazolylmethyl or N-saccharinylmethyl. Most preferred is the phthalocyanine chromophore, especially in combination with phthalocyanine pigments.

The crude pigment is a pigment as obtained from its synthesis after drying, comprising from 10 to 100% by weight of primary particles and/or aggregates of size $\geq 10$ μm. Drying, however, does not exclude the presence of low amounts of residual moisture (water and/or organic solvents). Generally, crude is preferred which has not been acid-pasted or recrystallised. Suitable crude pigments are both inorganic and organic, preferably organic pigments or carbon blacks, most preferred polycyclic pigments, especially phthalocyanines, in particular copper phthalocyanines such as Colour Index Pigment Blue 15:1, 15:3, 15:6 or 16 as well as Pigment Green 7, 36 or 37, and dioxazines such as Pigment Violet 23 or 37. Crude copper phthalocyanine is prepared by any of the well established processes such as reaction of phthalic anhydride with urea and a copper salt in the presence of a catalytic amount of a transition metal compound such as ammonium molybdate, the reaction being carried out at elevated temperature in a high boiling aromatic solvent such as nitrobenzene or in the absence of a solvent in a "dry-bake" melt process. Standard processes for the production of crude copper phthalocyanine are detailed in "The Phthalocyanines" by F. H. Moser and A. L. Thomas, Vol. II/chapter 2, © CRC press 1983, the disclosures of which are incorporated herein by reference. Crude copper phthalocyanine produced according to these processes is of non-pigmentary size, typically ranging from 10 μm-100 μm.

To prepare dioxazine derivatives, generally chloranil is first reacted with aromatic amines in the presence of acid-binding agents (e.g., sodium acetate) to form the 2,5-diarylamino-3,6-dichlorobenzoquinone. The corresponding dichlorodiphenedioxazine is obtained by oxidative cyclization of the latter in a high-boiling solvent in the presence of a catalyst (e.g., aluminum chloride or benzenesulfochloride) that lowers the cyclization temperature.

Carbon blacks for use as a pigment are industrially manufactured products, which are produced under carefully controlled conditions and consist of elemental carbon with extremely small particles, which may also contain chemically bound hydrogen, oxygen, nitrogen, and sulfur. It can be produced by simply burning oils, fats, or resinous materials and quenching or cooling the flame either on a cool surface (impingement black) or in special chimneys (lamp black); such a process is also known as the "Degussa gas black process". Most important is the furnace black process (developed in the USA in the 1930s and substantially improved after 1945), a continuous process allowing the production of a variety of carbon black grades under carefully controlled conditions. Further processes known as thermal black and acetylene black processes are used for the production of specialties.

However, surprisingly the process of the invention is not only advantageous for phthalocyanine, dioxazine and carbon black pigments. On the contrary, notably useful are many more pigments described in the Colour Index or otherwise known, such as Pigment Yellow 1, 3, 12, 13, 14, 15, 17, 24, 34, 42, 53, 62, 73, 74, 83, 93, 95, 108, 109, 110, 111, 119, 120, 123, 128, 129, 139, 147, 150, 151, 154, 164, 168, 173, 174, 175, 180, 181, 184, 185, 188, 191, 191:1, 191:2, 193, 194 and 199; Pigment Orange 5, 13, 16, 22, 31, 34, 40, 43, 48, 49, 51, 61, 64, 71, 73 and 81; Pigment Red 2, 4, 5, 23, 48, 48:1, 48:2, 48:3, 48:4, 52:2, 53:1, 57, 57:1, 88, 89, 101, 104, 112, 122, 144, 146, 149, 166, 168, 170, 177, 178, 179, 181, 184, 185, 190, 192, 194, 202, 204, 206, 207, 209, 214, 216, 220, 221, 222, 224, 226, 242, 248, 254, 255, 262, 264, 270 and 272; Pigment Brown 23, 24, 25, 33, 41, 42, 43 and 44; Pigment Violet 19, 23, 29, 31, 37 and 42; Pigment Blue 15, 15:1, 15:2, 15:3, 15:4, 15:6, 16, 25, 26, 28, 29, 60, 64 and 66; Pigment Green 7, 17, 36, 37 and 50; Pigment White 6, 6:1 and 7; Pigment Black 6, 7, 8, 10, 12, 27, 30, 31, 32 and 37; Vat Red 74; 3,6-di(3',4'-dichloro-phenyl)-2,5-dihydro-pyrrolo[3,4-c]pyrrole-1,4-dione, 3,6-di(4'-cyano-phenyl)-2,5-dihydro-pyrrolo[3,4-c]pyrrole-1,4-dione and 3-phenyl-6-(4'-tert-butyl-phenyl)-2,5-dihydro-pyrrolo[3,4-c]pyrrole-1,4-dione; as well as mixtures and solid solutions thereof.

Besides the above-mentioned, most preferred polycyclic pigments, azo pigments such as disazo yellow pigments or laked azo red pigments are particularly interesting. Preferred disazo yellow pigments or laked azo red pigments are Pigment Yellow 12, Pigment Yellow 13, Pigment Red 48:1, Pigment Red 48:2, Pigment Red 48:3, Pigment Red 48:4, Pigment Red 52:2, Pigment Red 53:1, Pigment Red 57 or Pigment Red 57:1.

Azo pigments are generally prepared in known ways, for example by azo coupling and if applicable condensation or laking with a metal (preferably divalent).

The second essential component (b) to be added to the crude pigment for dry-milling is a chromophore substituted by sulfo; $SO_3R_1$; alkali, earth alkali or $N^+R_1R_2R_3R_4$ sulfonato; $SO_2NR_1R_2$; $CH_2NR_1R_2$, phthalimidomethyl, N-pyrazolylmethyl or N-saccharinylmethyl, wherein $R_1$, $R_2$, $R_3$ and $R_4$ are independently from each other hydrogen or $C_1$-$C_{24}$alkyl, $C_3$-$C_{24}$cycloalkyl, $C_2$-$C_{24}$alkenyl, $C_7$-$C_{24}$aralkyl or $C_6$-$C_{24}$aryl each unsubstituted or substituted by hydroxy and/or halogen, whereby alkyl may be uninterrupted or optionally interrupted from one to ten times by O, $N(C_1$-$C_8$alkyl) or NH, and phthalimido is unsubstituted or substituted by halogen or nitro.

Most compounds (b) are pigment derivatives well-known as crystal growth inhibitors, rheology improvers or dispersants, wherein the chromophore core (sometimes in reduced or oxidized form) is substituted preferably by metal or ammonium sulfonates (such as sodium, laurylammonium or quaternary (ar-)alkyl ammonium sulfonates, which may further have hydroxy groups), or by tertiary aminomethyl (such as dimethylaminomethyl) or phthalimidomethyl groups.

Preferred chromophores are phthalocyanine, 1,4-diketo-2,5-dihydro-pyrrolo[3,4c]-pyrrole, dioxazine, perylene and/or quinacridone (including quinacridonequinone and 6,13-dihydroquinacridone) cores. It is most adequate to use derivatives (b) which are either colorless or exhibit a colour similar to the colour of the pigment to be milled ($\Delta h^* \leq 30$ in 50:50 masstone with $TiO_2$), preferably but not necessarily the same or a closely related chromophore.

The third essential component for dry-milling is the resin (c). The kind of resin is not particularly restricted as long as the resin remains pulverulent during dry-milling and is soluble in aromatic solvents. Typical examples of suitable resins are rosin; rosin salts of mono- or divalent metals; chemically modified rosins such as phenol-modified, hydrogenated, dehydrogenated or disproportionated rosins; dimerised or polymerized rosins; esterified rosins or partially esterified rosins; modified maleic rosin; mono- or divalent metal salts of chemically modified rosins; hydrocarbon and modified hydrocarbon resins; alkyd resins; polyamide resins; cellulose resins or mixtures of any two or more thereof.

The principal component of rosin is abietic acid (minor components being isomers and/or homologues thereof, such as neoabietic acid, levopimaric acid, pimaric acid, isopimaric acid and/or palustric acid). Rosin salts of mono- or divalent metals are for example sodium, potassium, calcium, zinc or magnesium rosinates. Phenol-modified rosins (also called rosin-modified phenol resins or synthetic copals though rosin generally predominates in quantity and character) are well-known in the art. Esterified rosin is a rosin, the carboxy groups of which are esterified with a polyalcohol having for example from 2 to 12, preferably from 3 to 6 hydroxy groups, such as glycerol or pentaerythritol. The modified hydrocarbon resin may optionally be a hybrid hydrocarbon resin. Polyamide resins are preferably low molecular (average molecular weight $M_w$ up to about 15 000). All suitable resins are known in the art.

Preferred resins are rosin, phenol-modified rosins, metal salts of rosin, metal salts of chemically modified rosins and mixtures thereof. A preferred cellulose resin is nitrocellulose.

The molecular weight distribution of polymers can be determined by well-known methods, such as for example through ultracentrifugation and gel permeation. The softening point is suitably determined by methods well-known in the art, for example through the ring and ball method.

An extender (d) may preferably be added at the dry-milling stage, too. Suitable extenders are in general white or transparent inorganic compounds, which can optionally be chemically modified or surface-treated to improve their properties in inks, such as hiding power, opacity or dispersibility. Typical examples are aluminium silicate (kaolin), magnesium-aluminium silicate (French chalk), silica (silicon dioxide), zinc oxide, zinc sulphide, barium sulphate, barium sulphate-zinc sulphide (lithopone), calcium carbonate, magnesium carbonate, aluminium trihydrate (hydrargillite, gibbsite), titanium dioxide and mixtures thereof.

It was surprisingly found that adding the extender already at the dry-milling stage provides additional technical advantages while enabling to use extenders without a chemical modification or surface treatment, or with a coarse particle size. This is particularly advantageous in the case of the preferred extenders, which are metal oxides, sulfides, sulfates and silicates, most preferred oxides of Al, Si, Ti, Zn or Zr and especially silicates, hydroxy silicates or oxy silicates of Al, Ba, Be, Ca, K, Mg, Na, Ti, Zn and/or Zr, which may optionally further comprise minor amounts of transition metals.

Much preferably, an antioxidant is also added. It has been found that there is a beneficial effect as a result of the in situ milling process on the efficacy of the antioxidant by providing intimate surface contact with the pigment and resin to be stabilised. The antioxidant is most preferably added in an amount of from 2 to 6% by weight, based on the crude pigment.

Suitable are all known antioxidants, for example alkyl phenols, alkylthiomethylphenols, eugenol, secondary amines, thioether, phosphites, phosphonites, dithiocarbamates, gallates, malonates, propionates, acetates and other esters, carboxamides, hydroquinones, ascorbic acid, triazines, benzyl compounds as well as tocopherols and analogue terpenes. Such antioxidants are known to the skilled artisan and also available commercially, for example from the sources indicated in WO02/100 960 (page 13/lines 1-20) or under the trade marks IRGANOX® and TINUVIN® (Ciba Specialty Chemicals Inc.). General information about antioxidants can be found in Taschenbuch der Kunststoff-Additive (R. Gächter and H. Müller, Carl Hanser Verlag München Wien, 2. Ausgabe 1983, ISBN 3-446-136894) or Plastics Additives Handbook (H. Zweifel, $5^{th}$ Ed. 2001, Hanser Publishers Munich, ISBN 3-446-21654-5), too.

The preferred antioxidants are hindered alkyl phenols and especially 2,6-di-tert.-butyl-p-cresol, the melting point of which is 71° C. Thus, dry-milling is particularly preferred performed at a temperature of 70° C. or below, for example from 0 to 70° C. The same temperature range is nevertheless valid for other antioxidants, too. As dry-milling generates heat, the dry-mill should be cooled efficiently so as to maintain an inner temperature of preferably from 50 to 65° C., most preferably from 55 to 62° C. Lower temperatures are suitable but require more cooling energy without providing any benefits. Higher temperatures up to just below the antioxidant's melting point or just below the resin/antioxidant blend's softening point are also suitable but must be tightly controlled in order to avoid any local overheating.

Hindered alkyl phenols are phenols having at least one and preferably two alkyl groups ortho to the phenolic hydroxy. One or preferably both alkyl groups ortho to the phenolic hydroxy are preferably secondary or tertiary alkyl, most preferred tertiary alkyl, especially tert.-butyl, tert.-amyl or 1,1, 3,3-tetramethylbutyl.

Further optional components are those well-known in the art. For example, small amounts of common liquid solvents such as chlorinated or aromatic hydrocarbons or alcohols can be used as phase directors, provided that the millbase composition remains pulverulent or granular during milling. These solvents may be present as residual "moisture" in the dry crude pigment. Hyperdispersants, waxes, extenders and/or dyestuffs can be added as well in usual amounts if desired. Preferably, the further components also include crystal growth inhibitors, rheology improvers and/or dispersants.

It is instantly essential that both the pigment derivative (b) and the resin (c) are present at least during the final stage of dry-milling, much preferably during the whole dry-milling step of the crude pigment (a). The final stage of dry-milling is the step in which the average particle size of the pigment last decreases by a factor of 2, preferably by a factor of 1½, to its final value (such as from 0.8 µm to 0.4 µm or from 0.9 µm to 0.6 µm, respectively). An extender (d) is optionally added already before or during dry-milling, preferably before the final stage of dry-milling, but may alternatively be omitted or dry-blended after dry-milling, too. Overall ink performance is, however, improved when an extender is present during milling. Most preferred, the extender (d) is present during the whole dry-milling step. The antioxidant is not essential, but nevertheless generally improves the composition's properties.

However, surprisingly essential is the instant, narrowly defined total amount of resin. It has been found that less than 20% by weight of resin, based on the amount of crude pigment (a), surprisingly leads to poorer dispersibility, dispersion development, gloss and transparency while more than 55% by weight of resin, based on the crude pigment, leads to poorer flow, restricts formulation flexibility and is uneconomic. The total amount of resin is preferably from 25% to 50% by weight, based on the amount of crude pigment (a).

The preferred quantities of the components are preferably combined together. Thus, preferably from 10 to 12% by weight of chromophore derivative (b) is used together with preferably from 25% to 50% by weight, based on the amount of crude pigment (a), of resin (c) and/or with from 5 to 18% by weight, most preferred from 10 to 18% by weight, based on the total weight of (a) and (b), of an extender (d).

The amount of optional further components, each of which can be added independently from the others at once or in portions at any stage of the process either before or during or after dry-milling, is suitably chosen according to the amount of pigment, pigment derivative, resin and antioxidant, in order the amount of pigment to be from 55 to 75% by weight, preferably from 60 to 70% by weight of the total composition.

Milling, as defined herein, means a process by which the solids are subject to attrition, grinding or the like to achieve particle size reduction. In this instance the milling technique involved is dry-milling which means a process for size reduction which is substantially free of liquid. However, a low level of liquid may be present during the milling stage as long as the resultant milled material remains a free flowing dry powder, for example residual humidity or solvent. Suitable equipment for dry-milling may for example be a rotating or vibrating ball mill, each working either batchwise or continuously, or a jet- or high-speed mill.

The dry-milling process is most suitably operated at a temperature below the melting point of the components, particularly of the antioxidant, especially when the components are added separately. However, it is also possible for example first to incorporate the antioxidant into a phenol-modified or other resin and then to mill at a temperature above the melting point of the antioxidant but lower than the softening point of resin/antioxidant blend.

The mill can if desired be inertised partially or entirely with an inert gas, such as $CO_2$, $N_2$ or Ar. However, generally inertisation does not provide major advantages.

The compositions obtained by the process of the invention are also new. Hence, the invention also pertains to a pulverulent or granular composition comprising
(a) from 55 to 75% by weight, based on the composition, of a dry-milled pigment;
(b) from 8 to 15% by weight, preferably from 10 to 12% by weight, based on the amount of crude pigment (a), of a chromophore substituted by sulfo; $SO_3R_1$; alkali, earth alkali or $N^+R_1R_2R_3R_4$ sulfonato; $SO_2NR_1R_2$; $CH_2NR_1R_2$, phthalimidomethyl, N-pyrazolylmethyl or N-saccharinylmethyl, wherein $R_1$, $R_2$, $R_3$ and $R_4$ are independently from each other hydrogen or $C_1$-$C_{24}$alkyl, $C_3$-$C_{24}$cycloalkyl, $C_2$-$C_{24}$alkenyl, $C_7$-$C_{24}$aralkyl or $C_6$-$C_{24}$aryl each unsubstituted or substituted by hydroxy and/or halogen, whereby alkyl may be uninterrupted or optionally interrupted from one to ten times by O, $N(C_1$-$C_8$alkyl) or NH, and phthalimido is unsubstituted or substituted by halogen or nitro;
(c) from 20 to 55% by weight, preferably from 25% to 50% by weight, based on the amount of crude pigment (a), based on the amount of pigment, of a resin;
(d) preferably from 2 to 18% by weight, more preferably from 5 to 18% by weight, most preferred from 10 to 18% by weight, based on the total weight of (a) and (b), of an extender; and
(e) optionally further components, comprising preferably from 1 to 10% by weight, based on the amount of crude pigment (a), of an antioxidant.

The skilled artisan will obviously understand that the amounts of components (a), (b), (c), (d) and (e) depend on each other, the total weight of the composition including optional further components being always 100%. For example, when there are no further components, the sum of (b), (c), (d) and (e) is from 25 to 45% by weight of the composition, depending on the amount of (a).

The dry-milled pigment of the invention should be understood to be a pigment as obtainable by the instant process, not having been additionally subjected after dry-milling to a solvent treatment to substantially modify or improve its crystallinity, crystal phase, particle shape, particle size or particle size distribution. The instant composition, which may also comprise further components as disclosed above, is easily dispersed in liquid aromatic hydrocarbons or compositions comprising liquid aromatic hydrocarbons, such as varnishes for publication gravure or packaging printing inks.

Liquid aromatic hydrocarbons are for example benzene, toluene, xylene or mesitylene, preferably toluene or xylene. In general, it is suitable to disperse the instant pigment composition in at least 100% by weight of aromatic hydrocarbon, preferably at least 200% by weight of aromatic hydrocarbon, based on the weight of pigment. The aromatic hydrocarbon may be used alone or in mixture of two or more (for example mixtures of xylene isomers), optionally in combination with further ink solvents compatible with aromatic hydrocarbons, such as those conventionally used in gravure or packaging inks.

Preferably, the total amount of varnish including the aromatic hydrocarbon and optionally the further solvents in which the instant pigment composition is surprisingly easily dispersed is about from 200 to 500% parts by weight, based on the amount of instant composition, thus obtaining a concentrated pigment varnish comprising about from 12 to 25% by weight of pigment, based on the pigmented varnish. This concentrated varnish is then normally further diluted with further solvent or ink varnish, so as to obtain a publication gravure or packaging ink comprising preferably from 6 to 9% by weight of pigment, based on the publication gravure or packaging ink.

Hence, the invention also pertains to a process for preparing a pigment dispersion, comprising the step of mixing the instant composition with a liquid comprising from 100 to 600% by weight, based on the weight of pigment (a), of an aromatic hydrocarbon or a mixture of aromatic hydrocarbons, and dispersing by stirring means. In a particular embodiment, the liquid further comprises an ink solvent or mixture of ink solvents compatible with aromatic hydrocarbons, preferably in a ratio of from 0.001 to 500% by weight of ink solvent or mixture of ink solvents compatible with aromatic hydrocarbons, based on the weight of the aromatic hydrocarbon or mixture of aromatic hydrocarbons. The further ink solvents are adequately different from aromatic hydrocarbons. Preferred further ink solvents are alcohols, ethers, esters, ketones or mixtures thereof.

The aromatic hydrocarbon can be added neat or in combination with further components dissolved or dispersed therein, such as those usually comprised in ink varnishes. Such further components are well-known in the art and do not require to be enumerated in detail here. One may if desired consult a handbook, for example Ullmann's Encyclopedia of Industrial Chemistry, ©2000, Printing Inks—Offset Printing. Typical examples are modified phenolic resins, waxes, extenders, hyperdispersants and other resins at the appropriate concentration for final ink formulation.

The aromatic hydrocarbon has preferably a boiling point of from 100 to 350° C. at $10^5$ Pa and is suitably liquid at the temperature of processing, preferably liquid at 20° C.

The pigment is generally dispersed with low dispersion energy and advantageously retains its typical characteristics as obtained by dry-milling. For example, copper phthalocyanine remains a mixture of α and β crystal phases, typically with from 15 to 70% by weight, preferably from 25 to 50% by weight of the α crystal phase. Also the shape of the particles with damaged edges and corners is typical of dry-milling. Thus, differentiation from recrystallized pigments is normally easy though this depends highly on the pigment's chemical identity.

The compositions of the invention can be readily dispersed into the solvent or solvent including binder using suitable low shear dispersing equipment such as low and high speed stirrers or mixers which are fitted with suitable agitation heads, for example high speed Dispermat™ or premix stirrers fitted with a cowles impeller, a trifoil impeller or a butterfly impeller, low shear stirrers including conventional stirrers capable of low speed agitation using anchor and paddle stirrers for agitation. However, one can alternatively also use conventional grinding or milling equipment such as such as an extruder, kneader or beadmill, preferably under milder operating conditions.

Preferably, dispersion is obtained without heating, especially with cooling.

Suitable low shear dispersing equipment is for example a disperser, such as described above. However, one can alternatively also use equipment adequate to reach higher shear, such as an extruder or a three roll or bead mill, preferably under mild operating conditions.

It is suitable to disperse the pigment at a concentration level of from 5 to 30% by weight, based on the total weight of the dispersion. Preferably, the pigment is dispersed at a concentration level of from 6 to 25% by weight, based on the total weight of the dispersion. In a particular aspect of the invention, the pigment is first dispersed at a concentration level of from 12 to 25% by weight, based on the total weight of the dispersion, then further to a level of from 6 to 9% by weight, based on the total weight of the dispersion.

Hence, the invention also pertains to a pigment dispersion comprising
(a) from 6 to 25% by weight, based on the total weight of the dispersion, of a dry-milled pigment;
(b) from 8 to 15% by weight, preferably from 10 to 12% by weight, based on the amount of crude pigment (a), of a chromophore substituted by sulfo; $SO_3R_1$; alkali, earth alkali or $N^+R_1R_2R_3R_4$ sulfonato; $SO_2NR_1R_2$; $CH_2NR_1R_2$, phthalimidomethyl, N-pyrazolylmethyl or N-saccharinylmethyl, wherein. $R_1$, $R_2$, $R_3$ and $R_4$ are independently from each other hydrogen or $C_1$-$C_{24}$alkyl, $C_3$-$C_{24}$cycloalkyl, $C_2$-$C_{24}$alkenyl, $C_7$-$C_{24}$aralkyl or $C_6$-$C_{24}$aryl each unsubstituted or substituted by hydroxy and/or halogen, whereby alkyl may be uninterrupted or optionally interrupted from one to ten times by O, $N(C_1$-$C_8$alkyl) or NH, and phthalimido is unsubstituted or substituted by halogen or nitro;
(c) from 20 to 55% by weight, preferably from 25% to 50% by weight, based on the amount of crude pigment (a), based on the amount of pigment, of a resin;
(d) preferably from 2 to 18% by weight, more preferably from 5 to 18% by weight, most preferred from 10 to 18% by weight, based on the total weight of (a) and (b), of an extender;
(e) optionally further components, comprising preferably from 1 to 10% by weight, based on the amount of crude pigment (a), of an antioxidant; and
(f) a liquid comprising from 100 to 600% by weight, based on the weight of pigment (a), of an aromatic hydrocarbon or a mixture of aromatic hydrocarbons.

The pigment dispersion may optionally also contain further components, such as for example usual further solvents.

The pigment dispersions of the invention are advantageously used for the preparation of publication gravure or packaging printing inks. The technique of preparing publication gravure and packaging printing inks is well-known in the art.

Of course, the instant compositions can also be incorporated into solid binders by kneading or extrusion, thus producing masterbatches or ink concentrates. Thus, the invention also pertains to a process for the preparation of a pigment composition, wherein a composition instantly obtained by dry-milling is kneaded or extruded, optionally with from 0 to 300% by weight, based on the pigment composition obtained by dry-milling, of a binder which is solid at 20° C. This process enables the preparation of compositions comprising special binders, which are themselves not suitable for the instant dry-milling process. Useful binders include for example those disclosed in WO05/044 924. These pigment compositions may be further processed into inks according to usual processes, or also at low shear just like the instant dry-milled compositions.

The instantly obtainable publication gravure or packaging inks have surprisingly superior application properties, such as excellent dispersion grade, colour strength, gloss, and strikethrough.

The examples which follow illustrate the invention, without limiting it in any way ("%" are by weight where not otherwise specified):

COMPARATIVE EXAMPLE 1

90.25 g of crude copper phthalocyanine and 9.75 g of Solsperse™ 5000 (a copper phthalocyanine substituted by 1-2 tetraalkylammonium sulfato groups) are ground together in a ballmill at ≦65° C. until the phase change gives an α content between 30%-60%. 36.0 g of the milled material are mixed with 137.0 g of toluene comprising 62.6 g of a metal resinate. The mixture is premixed at 4000 r.p.m. for 15 minutes using a 4.2 cm Cowles impeller under water cooling. The cowles impeller is then replaced with a triple disc impeller, 320 g of 2 mm glass beads are added, and the premixed ink is beadmilled at 2000 r.p.m. for 30 minutes. This dispersion is diluted with 113.5 g of toluene comprising 46.85 g of metal resinate (50%), followed by further toluene so that a flow of 30 seconds in GS cup is obtained. Illustrations are prepared by drawdown of the dispersion after each the premix and beadmill stages on coated and uncoated papers using a No. 0 K-Bar. The colour strength, gloss, hue and transparency are assessed in usual manner. The print density for each print is measured using a densitometer (Gretag D19C). The gloss is measured at equal film weight using an Erichsen mini glossmaster at 60°. The dispersion is characterised by microscope assessment.

EXAMPLE 1

71.05 g of crude copper phthalocyanine, 7.90 g of Solsperse™ 5000 and 21.05 of a phenolic modified rosin ($M_W$~12000) are ground together in a ballmill at ≦65° C. until the phase change gives an α content between 30%-60%. 48.0 g of the milled material are mixed with 157.0 g of toluene comprising 53.1 g of a metal resinate. The mixture is premixed at 4000 r.p.m. for 15 minutes using a 4.2 cm Cowles impeller under water cooling. The Cowles impeller is then replaced with a triple disc impeller, 320 g of 2 mm glass beads are added, and the premixed ink is beadmilled at 2000 r.p.m.

for 30 minutes. The thus obtained dispersion is diluted with 113.5 g of toluene comprising 46.85 g of metal resinate (50%), followed by further toluene so that a flow of 30 seconds in GS cup is obtained. Illustrations are prepared by drawdown of the dispersion after each the premix and beadmill stages on coated and uncoated papers using a No. 0 K-Bar. The colour strength, gloss, hue and transparency are assessed in the same manner as in comparative example 1.

EXAMPLE 2

71.05 g of crude copper phthalocyanine, 7.90 g of Solsperse™ 5000 and 21.05 of a modified Zn/Ca rosin resinate are ground together in a ballmill at $\leq 65°$ C. until the phase change gives an $\alpha$ content between 30%-60%. 21.3 g of the milled material are mixed with 135.5 g of toluene comprising 43.2 g of a metal resinate. The mixture is premixed at 4000 r.p.m. for 15 minutes using a 4.2 cm Cowles impeller under water cooling. The Cowles impeller is then replaced with a triple disc impeller, 320 g of 2 mm glass beads are added, and the premixed ink is beadmilled at 2000 r.p.m. for 30 minutes. Further toluene is then added so that a flow of 30 seconds in GS cup is obtained. Illustrations are prepared by drawdown of the dispersion after each the premix and beadmill stages on coated and uncoated papers using a No. 0 K-Bar. The colour strength, gloss, hue and transparency are assessed in the same manner as in comparative example 1.

EXAMPLE 3

71.05 g of crude copper phthalocyanine, 7.90 g of Solsperse™ 5000 and 21.05 of a modified Zn/Ca rosin resinate are ground together in a ballmill at $\leq 65°$ C. until the phase change gives an $\alpha$ content between 30%-60%. The obtained mixture is then dry-blended with 11.1 g of hydrous aluminum silicate powder. 23.6 g of the milled material are mixed with 133.2 g of toluene comprising 43.2 g of a metal resinate. The mixture is premixed at 4000 r.p.m. for 15 minutes using a 4.2 cm Cowles impeller under water cooling. The Cowles impeller is then replaced with a triple disc impeller, 320 g of 2 mm glass beads are added, and the premixed ink is beadmilled at 2000 r.p.m. for 30 minutes. Further toluene is then added so that a flow of 30 seconds in GS cup is obtained. Illustrations are prepared by drawdown of the dispersion after each the premix and beadmill stages on coated and uncoated papers using a No. 0 K-Bar. The colour strength, gloss, hue and transparency are assessed in the same manner as in comparative example 1.

EXAMPLE 4

63.64 g of crude copper phthalocyanine, 6.82 g of Solsperse™ 5000, 20.45 of a modified Zn/Ca rosin resinate and 9.09 g of hydrous aluminum silicate powder are ground together in a ballmill at $\leq 65°$ C. until the phase change gives an $\alpha$ content between 30%-60%. 22.6 g of the milled material are mixed with 134.3 g of toluene comprising 43.1 g of a metal resinate. The mixture is premixed at 4000 r.p.m. for 15 minutes using a 4.2 cm Cowles impeller under water cooling. The Cowles impeller is then replaced with a triple disc impeller, 320 g of 2 mm glass beads are added, and the premixed ink is beadmilled at 2000 r.p.m. for 30 minutes. Further toluene is then added so that a flow of 30 seconds in GS cup is obtained. Illustrations are prepared by drawdown of the dispersion after each the premix and beadmill stages on coated and uncoated papers using a No. 0 K-Bar. The colour strength, gloss, hue and transparency are assessed in the same manner as in comparative example 1. The ink has a much improved flow, as compared with the inks of examples 2 and 3.

EXAMPLE 5

63.64 g of crude copper phthalocyanine, 6.82 g of n-tridecyl ammonium copper phthalocyanine monosulfonate, 20.45 of a modified Zn/Ca rosin resinate and 9.09 g of hydrous aluminum silicate powder are ground together in a ballmill at. $\leq 65°$ C. until the phase change gives an a content between 30%-60%. 21.3 g of the milled material are mixed with 135.5 g of toluene comprising 43.2 g of a metal resinate. The mixture is premixed at 4000 r.p.m. for 15 minutes using a 4.2 cm Cowles impeller under water cooling. The Cowles impeller is then replaced with a triple disc impeller, 320 g of 2 mm glass beads are added, and the premixed ink is beadmilled at 2000 r.p.m. for 30 minutes. Further toluene is then added so that a flow of 30 seconds in GS cup is obtained. Illustrations are prepared by drawdown of the dispersion after each the premix and beadmill stages on coated and uncoated papers using a No. 0 K-Bar. The colour strength, gloss, hue and transparency are assessed in the same manner as in comparative example 1.

EXAMPLE 6

55.55 g of crude copper phthalocyanine, 5.95 g of SOLSPERSE™ 5000, 30.55 g of a modified Zn/Ca rosin resinate and 7.95 g of hydrous aluminum silicate powder are ground together in a ballmill at $\leq 65°$ C. until the phase change gives an a content between 30%-60%. 24.4 g of the milled material are mixed with 135.5 g of toluene comprising 40.09 g of a metal resinate. The mixture is premixed at 4000 r.p.m. for 15 minutes using a 4.2 cm Cowles impeller under water cooling. The Cowles impeller is then replaced with a triple disc impeller, 320 g of 2 mm glass beads are added, and the premixed ink is beadmilled at 2000 r.p.m. for 30 minutes. Further toluene is then added so that a flow of 30 seconds in GS cup is obtained. Illustrations are prepared by drawdown of the dispersion after each the premix and beadmill stages on coated and uncoated papers using a No. 0 K-Bar. The colour strength, gloss, hue and transparency are assessed in the same manner as in comparative example 1.

EXAMPLE 7

63.64 g of crude copper phthalocyanine, 6.82 g of SOLSPERSE™ 5000, 20.45 of a modified Zn/Ca rosin resinate and 9.09 g of a treated calcium carbonate (SOCAL™ U1S2) are ground together in a ballmill at $\leq 65°$ C. until the phase change gives an $\alpha$ content between 30%-60%. 21.3 g of the milled material are mixed with 135.5 g of toluene comprising 43.2 g of a metal resinate. The mixture is premixed at 4000 r.p.m. for 15 minutes using a 4.2 cm Cowles impeller under water cooling. The Cowles impeller is then replaced with a triple disc impeller, 320 g of 2 mm glass beads are added, and the premixed ink is bead-milled at 2000 r.p.m. for 30 minutes. Further toluene is then added so that a flow of 30 seconds in GS cup is obtained. Illustrations are prepared by drawdown of the dispersion after each the premix and beadmill stages on coated and uncoated papers using a No. 0 K-Bar. The colour strength, gloss, hue and transparency are assessed in the same manner as in comparative example 1.

Comparative Coloristic Properties (as Compared with a Bead-Milled Commercial Product after Bead-Milling as Standard)

After Premixing:

| Example | Dispersion quality | Colour strength [%] | Gloss | Transparency |
|---|---|---|---|---|
| Standard | ----- | 70 | -- | -- |
| Comparative example 1 | --- | 50 | - | - |
| Example 1 | +++++ | 100 | ++ | + |
| Example 5 | + | 95 | ++ | |
| Example 6 | +++ | 100 | +++ | |
| Example 7 | + | 100 | ++ | |

After Bead-Milling:

| Example | Dispersion quality | Colour strength [%] | Gloss | Transparency |
|---|---|---|---|---|
| Standard | ● | 100 | ● | ● |
| Comparative example 1 | ● | 100 | | - |
| Example 1 | +++ | 105 | + | |
| Example 2 | ++++ | 110 | ++++ | |
| Example 3 | ++ | 110 | ++++ | |
| Example 4 | ++ | 105 | +++ | |
| Example 5 | + | 107 | = | + |
| Example 6 | ++ | 115 | ++ | +++ |
| Example 7 | ++ | 110 | ++ | +++ |

+++++ extremely superior
++++ much superior
+++ moderately superior
++ slightly superior
+ faintly superior
● standard
− faintly inferior
−− slightly inferior
−−− moderately inferior
−−−− much inferior
−−−−− extremely inferior The data show clearly that the composition of the dry-milling mixture is essential. The presence of an extender during dry-milling surprisingly largely increases the flow, while the colour strength and gloss are only slightly affected.

The invention claimed is:

1. A process for producing a pigment composition, comprising the step of milling together at 0 to 70° C. a composition comprising
    (a) a crude pigment;
    (b) from 8 to 15% by weight, based on the amount of crude pigment (a), of a chromophore substituted by sulfo; $SO_3R_1$; alkali, earth alkali or $N^+R_1R_2R_3R_4$ sulfonato; $SO_2NR_1R_2$; $CH_2NR_1R_2$, phthalimidomethyl, N-pyrazolylmethyl or N-saccharinylmethyl, wherein $R_1$, $R_2$, $R_3$ and $R_4$ are independently from each other hydrogen or $C_1$-$C_{24}$alkyl, $C_3$-$C_{24}$cycloalkyl, $C_2$-$C_{24}$alkenyl, $C_7$-$C_{24}$aralkyl or $C_6$-$C_{24}$aryl each unsubstituted or substituted by hydroxy and/or halogen, whereby alkyl may be uninterrupted or optionally interrupted from one to ten times by O, $N(C_1$-$C_8$alkyl) or NH, and phthalimido is unsubstituted or substituted by halogen or nitro;
    (c) from 20 to 55% by weight, based on the amount of crude pigment (a), of a resin selected from the group consisting of rosin, phenol-modified rosins, metal salts of rosin, metal salts of chemically modified rosins and mixtures thereof;
    (d) from 2 to 18% by weight, based on the total weight of (a) and (b), of an extender; and
    (e) optionally from 1 to 10% by weight, based on the amount of crude pigment (a), of an antioxidant and further optional components,
    wherein the composition remains pulverulent or granular during milling.

2. The process according to claim 1, wherein the pigment is a phthalocyanine, dioxazine or carbon black.

3. The process according to claim 2, wherein the pigment is Colour Index Pigment Blue 15:1, 15:3, 15:6 or 16, Pigment Green 7, 36 or 37, Pigment Violet 23 or 37 or Pigment Black 6, 7 or 8.

* * * * *